US008953446B1

(12) United States Patent
Wang et al.

(10) Patent No.: US 8,953,446 B1
(45) Date of Patent: Feb. 10, 2015

(54) LOAD BALANCING MULTICAST JOIN REQUESTS OVER INTERIOR AND EXTERIOR BGP PATHS IN A MVPN (75) Inventors: Lili Wang, Chelmsford, MA (US); Rahul Aggarwal, Menlo Park, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 125 days.

(21) Appl. No.: 13/332,214

(22) Filed: Dec. 20, 2011

(51) Int. Cl.
*H04J 3/14* (2006.01)
*H04L 12/28* (2006.01)
*H04J 3/26* (2006.01)
*G06F 15/16* (2006.01)
*G06F 15/173* (2006.01)

(52) U.S. Cl.
USPC ...... 370/231; 370/235; 370/390; 370/395.32; 370/401; 370/409; 370/432; 709/230; 709/238; 709/249

(58) Field of Classification Search
USPC ......... 370/390, 231, 238, 351, 428, 230, 392, 370/401, 229, 254, 342, 389, 463, 235, 370/395.32, 409, 432; 709/230, 238, 249
See application file for complete search history.

(56) References Cited

U.S. PATENT DOCUMENTS

| | | | |
|---|---|---|---|
| 6,208,647 B1 * | 3/2001 | Deng et al. | 370/390 |
| 6,728,777 B1 * | 4/2004 | Lee et al. | 709/238 |
| 7,792,021 B1 * | 9/2010 | Pankajakshan | 370/229 |
| 7,839,850 B2 * | 11/2010 | Kompella | 370/390 |
| 8,089,964 B2 * | 1/2012 | Lo et al. | 370/390 |
| 8,160,056 B2 * | 4/2012 | Van der Merwe et al. | 370/351 |
| 8,284,943 B2 * | 10/2012 | Carrasco | 380/278 |
| 2006/0088031 A1 * | 4/2006 | Nalawade | 370/390 |
| 2006/0133375 A1 * | 6/2006 | Napierala | 370/390 |
| 2006/0171331 A1 * | 8/2006 | Previdi et al. | 370/254 |
| 2006/0227723 A1 * | 10/2006 | Vasseur et al. | 370/254 |
| 2007/0076719 A1 * | 4/2007 | Allan et al. | 370/392 |
| 2007/0217419 A1 * | 9/2007 | Vasseur | 370/392 |
| 2012/0170578 A1 * | 7/2012 | Anumala et al. | 370/390 |
| 2013/0100953 A1 * | 4/2013 | Li et al. | 370/390 |

OTHER PUBLICATIONS

Rosen et al, "Multicast in MPLS/BGP IP VPNs," Network Working Group Internet Group Internet Draft, draft-ietf-l3vpn-2547bis-mcast-10.txt, Jan. 28, 2010, 89 pp.

(Continued)

*Primary Examiner* — Alpus H Hsu
*Assistant Examiner* — Camquyen Thai
(74) *Attorney, Agent, or Firm* — Shumaker & Sieffert, P.A.

(57) ABSTRACT

A network device receives a join request on a downstream interface, wherein the join request specifies a source device and multicast group, wherein the network device is positioned within a core network of a multicast virtual private network (MVPN) that transmits multicast traffic between the source device and a plurality of receivers associated with customer sites. The network device selects an upstream router to which to send the join request from among a plurality of upstream routers on paths leading to the source device, so as to avoid creating a join request loop in the core network. At least one of the upstream routers is positioned on an Exterior Border Gateway Protocol (EBGP) path toward the source device, and at least one of the upstream routers is positioned on an Interior BGP (IBGP) path toward the source device. The network device sends the join request to the selected upstream device.

16 Claims, 7 Drawing Sheets

(56) References Cited

OTHER PUBLICATIONS

Aggarwal et al, "BGP Encodings and Procedures for Multicast in MPLS/BGP IP VPNS," Network Working Group Internet Draft, draft-ietf-l3vpn-2547bis-mcast-bgp-08.txt, Oct. 1, 2009, 61 pp.

Aggarwal et al, "BGP Encodings for Multicast in MPLS/BGP IP VPNs," Network Working Group Internet Draft, draft-raggarwa-l3vpn-2547bis-mcast-bgp-02.txt, Jun. 2006, 45 pp.

Rosen et al, "Multicast in MPLS/BGP IP VPNs," Network Working Group Internet Group Internet Draft, draft-rosen-vpn-mcast-08.txt, Dec. 2004, 22 pp.

\* cited by examiner

LOAD BALANCING MULTICAST JOIN REQUESTS OVER INTERIOR AND EXTERIOR BGP PATHS IN A MVPN

TECHNICAL FIELD

The disclosure relates to computer networks and, more particularly, to multicast traffic in virtual private networks (VPNs) established over computer networks.

BACKGROUND

A computer network is a collection of interconnected computing devices that exchange data and share resources. In a packet-based network the computing devices communicate data by dividing the data into small blocks called packets. Certain devices within the network, such as routers, maintain routing information that describes routes through the network. In this way, the packets may be individually routed across the network from a source device to a destination device. The destination device extracts the data from the packets and assembles the data into its original form. Dividing the data into packets enables the source device to resend only those individual packets that may be lost during transmission.

Virtual private networks (VPNs) are often used to enable remotely located sources and receivers, e.g., remote customer sites, to share data. For example, a VPN may enable two or more remote customer sites, i.e., private networks, to securely share data over a public network, such as the Internet. In some cases, a VPN may be configured to support multicast traffic, such as Internet Protocol Television (IPTV), desktop conferences, corporate broadcasts, music and video web casts, and other forms of multimedia content. If a particular VPN is transmitting multicast traffic over the public network, it is referred to as a Multicast VPN (MVPN). Further details of MVPNs are described in Internet Draft, DRAFT-IETF-L3VPN-2547BIS-MCAST-10, "Multicast in MPLS/BGP IP VPNs," Internet Engineering Task Force, Jan. 28, 2010, and Internet Draft, DRAFT-ROSEN-VPN-MCAST-08, "Multicast in MPLS/BGP IP VPNs", December 2004, the entire contents of each of which are incorporated herein by reference.

For one or more MVPNs, provider edge (PE) routers coupled to the customer sites may conceptually build a multicast tree to carry multicast traffic from a multicast source through the public network so that the customer sites receive the multicast traffic as if the customer sites were directly attached to the same private network as the source. As an example, the MVPN may use protocol independent multicast (PIM) as a multicast routing protocol to forward multicast traffic from sources to receivers or subscriber devices for particular multicast groups within the customer sites. PE routers communicate using PIM control messages, including join requests and prune requests, to propagate requests from receivers to join or leave a multicast group upstream toward the source of the multicast traffic and thereby build the multicast tree. PE routers may communicate with other PE routers within an autonomous system using an Interior Border Gateway Protocol (IBGP), and may communicate with routers outside the autonomous system using an Exterior Border Gateway Protocol (EBGP).

SUMMARY

In general, techniques are described for load balancing multicast join requests across multiple upstream routers. In particular, downstream multicast join requests received by a provider edge (PE) router from a downstream device are load balanced across upstream routers on different paths toward a source device associated with a multicast group by, where at least one of the upstream routers lies on an EBGP path toward the multicast source device and at least one of the upstream routers lies on an IBGP path toward the multicast source device. For a PE router in an MVPN that has multiple potential upstream routers on different paths to the source, at least one on an EBGP path and at least one on an IBGP path, techniques of this disclosure enable the PE router to select an upstream router to which to send a join request in a manner so as to avoid join loops in the MVPN and also to load balance join requests across the upstream routers. Load balancing the join requests allows for subsequent multicast data flows to likewise be load balanced across the multiple EBGP and IBGP paths.

The techniques of this disclosure may provide one or more advantages. For example, in addition to avoiding join loops in MVPNs and load balancing the join requests across multiple upstream routers, the techniques may do so in a manner that reduces disruption to existing multicast traffic flows. In some cases, selecting a certain upstream router can cause the PE router to change its selected upstream neighbor when it receives a join request from the provider core. The techniques may reduce traffic disruption to existing flows by avoiding an unnecessary change to a selected upstream neighbor. As another example, the disclosure provides techniques for different types of MVPNs, including Next Generation MVPNs and Rosen MVPNs.

In one aspect, a method includes receiving a join request on a downstream interface of a network device, wherein the join request specifies a source device and a multicast group, wherein the network device is positioned within a core network of a multicast virtual private network (MVPN) that transmits multicast traffic between the source device and a plurality of receivers associated with customer sites. The method further includes, by the network device, selecting an upstream router to which to send the join request from among a plurality of upstream routers on paths leading to the source device, wherein at least one of the plurality of upstream routers is positioned on an Exterior Border Gateway Protocol (EBGP) path toward the source device and at least one of the plurality of upstream routers is positioned on an Interior BGP (IBGP) path toward the source device, and wherein the upstream router is selected to avoid a join request loop in the core network by selecting one of the upstream router on the EBGP path or the upstream router on the IBGP path based on at least one of an interface on which the join request was received, a total number of join requests already sent to each of the upstream routers, and a network address of the upstream router, and sending the join request to the selected upstream router.

In another aspect, a router includes a set of interfaces that transfer control messages and multicast traffic with at least one neighboring downstream router and a plurality of neighboring upstream routers, wherein at least one of the plurality of upstream routers is positioned on an Exterior Border Gateway Protocol (EBGP) path leading to a source device, and wherein at least one of the plurality of upstream routers is positioned on an Interior BGP (IBGP) path leading to the source device. A downstream one of the set of interfaces receives a join request from the neighboring downstream router, wherein the join request specifies a source device and a multicast group. The router further includes a control unit that includes a routing engine and a forwarding engine, wherein the control unit selects one of the plurality of neighboring upstream routers to which to send the join request, wherein the upstream router is selected to avoid a join request loop in the core network by selecting one of the upstream router on the EBGP path or the upstream router on the IBGP path based on at least one of an interface on which the join request was received, a total number of join requests already sent to each of the upstream routers, and a network address of the upstream router. The control unit sends the join request on an upstream one of the set of interfaces that corresponds to the selected neighboring upstream router.

In one aspect, a system includes a multicast source, a multicast receiver, a first provider edge (PE) router, a customer edge (CE) router on an Exterior Border Gateway Protocol (EBGP) path leading to the source from the first PE router, and a second PE router on an Interior BGP (IBGP) path leading to the source from the first PE router. The first PE router includes a set of interfaces that transfer control messages and multicast traffic with at least one neighboring downstream router, the CE router and the second PE router, wherein a downstream one of the set of interfaces receives a join request from the neighboring downstream router, wherein the join request specifies the multicast source and a multicast group. The first PE router also includes a control unit that includes a routing engine and a forwarding engine, wherein the control unit selects as the upstream router one of (i) the CE router on the EBGP path and (ii) the PE router on the IBGP path to which to send the join request, wherein the upstream router is selected to avoid a join request loop in the core network based on at least one of an interface on which the join request was received, a total number of join requests already sent to each of the upstream routers, and a network address of the upstream router. The control unit sends the join request on an upstream one of the set of interfaces that corresponds to the selected neighboring upstream router.

The details of one or more examples are set forth in the accompanying drawings and the description below. Other features, objects, and advantages will be apparent from the description and drawings, and from the claims.

DETAILED DESCRIPTION

Figure 1:
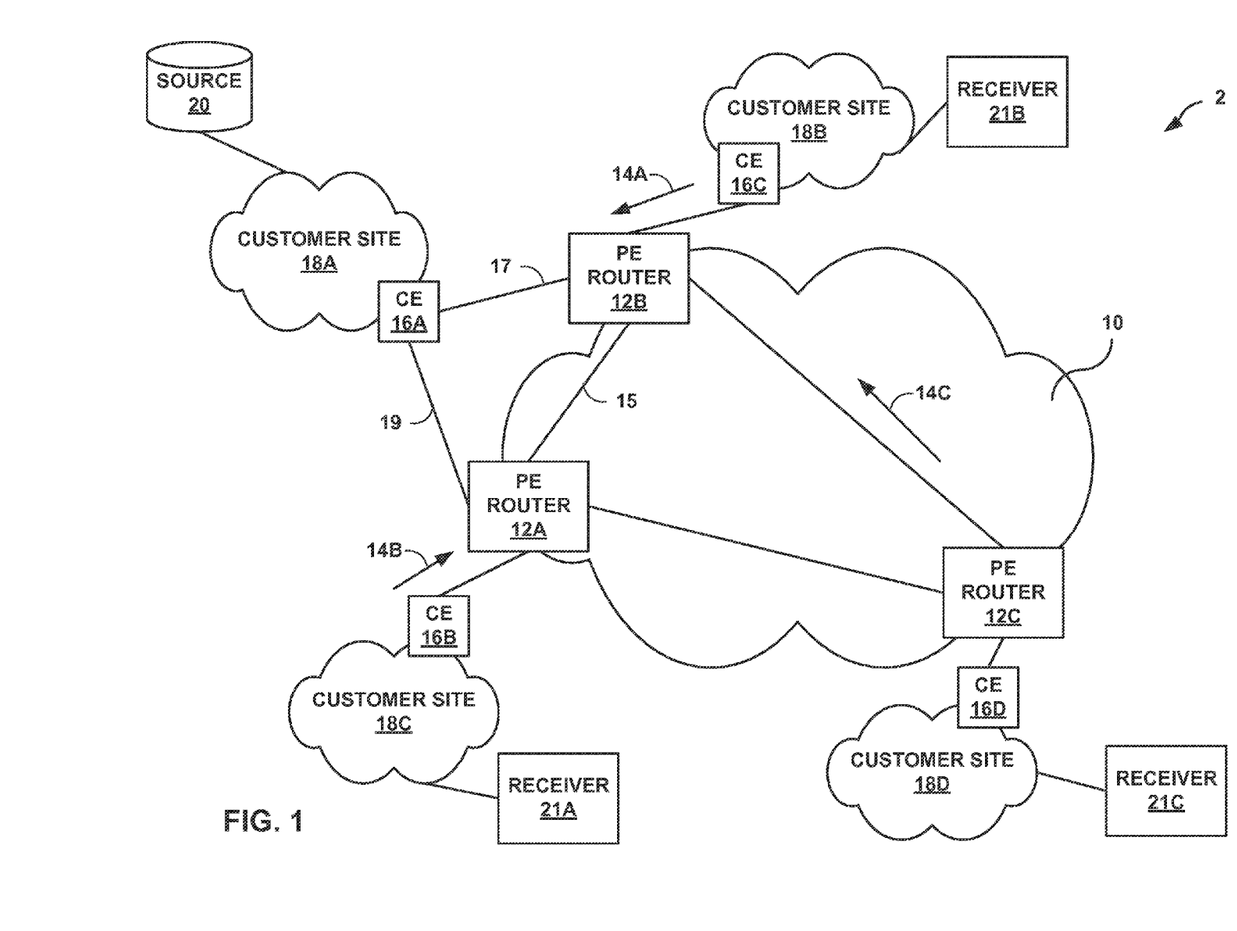
FIG. 1 is a block diagram illustrating an example system in which provider edge routers are configured to load balance multicast join control messages across a plurality of upstream routers over EBGP and IBGP paths in accordance with the techniques of this disclosure.

FIG. 1 is a block diagram illustrating an example system 2 in which provider edge (PE) routers 12A-12C (PE routers 12) are configured to load balance multicast join control messages across a plurality of upstream routers over EBGP and IBGP paths in accordance with the techniques of this disclosure. System 2 includes an example computer network 10 in which PE routers 12 support a VPN to provide multicast traffic (an "MVPN") between source 20 and receivers 21 associated with customer sites 18A-18D ("customer sites 18"). Each of PE routers 12 couples to one or more customer sites 18 via customer edge (CE) routers 16A-16D ("CE routers 16"). In some examples, network 10 is referred to as a "core" network, and interfaces of PE routers 12 that couple to another PE router 12 may be referred to as "core-facing" interfaces.

Computer network 10, for example, may include an enterprise network, a campus network, a service provider network, a home network, or another autonomous system. In any of these examples, remotely located source 20 and receivers 21A-21C ("receivers 21") within customer sites 18 may share data via computer network 10. As one example of network 10 as an enterprise network, each of customer sites 18 may comprise one or more servers or employee computer terminals located in different regions of a single office location. As another example of network 10 as an enterprise network, each of customer sites 18 may comprise a remote office location of a corporation such that enterprise network 10 may be extended across a public network, such as the Internet. Although illustrated in FIG. 1 as an enterprise network or a service provider network, the techniques of this disclosure are applicable to other network types, both public and private. Examples of other network types include local area networks (LANs), virtual local area networks (VLANs), virtual private networks (VPNs), and the like. In some examples, computer network 10 may be coupled to one or more additional private or public networks, e.g., the Internet. In other examples, computer network 10 may comprise the Internet or another public network. In some cases, computer network 10 may comprise a multi-protocol label switching (MPLS) network. In the illustrated example, computer network 10 includes PE routers 12. Although not illustrated, network 10 may include additional edge routers and/or core routers not shown.

Each of customer sites 18 may include a local area network (LAN) or a wide area network (WAN) that comprises a plurality of subscriber devices, such as desktop computers, laptops, workstations, PDAs, wireless devices, network-ready appliances, file servers, print servers or other devices. In some cases, customer sites 18 may be configured to support multicast traffic, such as Internet Protocol Television (IPTV), desktop conferences, corporate broadcasts, music and video web casts, and other forms of multimedia content.

The disclosure describes techniques for avoiding join loops in EIBGP multipath situations in MVPNs, and includes techniques applicable to MVPNs that are based on Internet Draft, DRAFT-ROSEN-VPN-MCAST-08, "Multicast in MPLS/BGP IP VPNs", December 2004 (referred to herein as "Rosen MVPNs"), as well as techniques that are applicable to MVPNs that are based on Internet Draft, DRAFT-IETF-L3VPN-2547BIS-MCAST-10, "Multicast in MPLS/BGP IP VPNs," Internet Engineering Task Force, Jan. 28, 2010 (referred to herein as "next generation MVPNs" or "NG MVPNs"). In a Rosen MVPN, the underlying transport infrastructure is multicast Generic Routing Encapsulation (GRE) tunnels, while in an NG MVPN, the underlying transport infrastructure may be Multi-Protocol Label Switching (MPLS) Label Switched Paths (LSPs) or GRE tunnels. A Rosen MVPN has PIM adjacencies between PE routers on a per-VRF basis to exchange information about multicast receivers, and includes multicast trees across the core (network 10) signaled by PIM running in the main routing instance. A NG MVPN uses BGP for PE-to-PE signaling, according to Internet Draft, DRAFT-RAGGARWA-L3VPN-2547-MCAST-BGP-02, June 2006, the entire contents of which are incorporated by reference herein.

In the illustrated example, PE routers 12 may use PIM to set up transmission of multicast traffic through computer network 10 via a shared tree from remote multicast sources, such as source 20, to remote receivers or subscriber devices, such as receivers 21 reachable by customer sites 18.

For each RP, a conceptual tree may be formed across computer network 10 to connect routers 12 that maintain state for multicast groups within the particular range. For example, in order to form the shared tree, one of routers 12 may select an upstream interface, i.e., a reverse path forwarding (RPF) interface, used to reach the rendezvous point (RP) router according to routing information stored on the router, and add it to shared tree 15.

In a strict IBGP case when the paths toward the source are all IBGP paths, equal cost multipath techniques may be applied because the costs of the paths within the autonomous system are known to the PE routers. In contrast, the introduction of an EBGP path 17 toward the source can create the potential for join loops in the control plane of the PE router, as the possible upstream paths may be of unequal cost. The scenario in which a router has multiple paths toward the source device for a multicast group, at least one of the upstream routers lies on an EBGP path toward the multicast source device and at least one of the upstream routers lies on an IBGP path toward the multicast source device, is referred to herein as the "EIBGP multipath" case. A downstream join request is a join request received by a router on an interface of the router that has been designated as a downstream interface.

In the example of FIG. 1, when PE router 12B receives a downstream join request 14A from a local CE router, for example, from CE router 16C, PE router 12B examines the possible paths toward source 20 that do not go through CE router 16C from which the join request was received. In the example of FIG. 1, PE router 12B has multiple upstream paths toward source 20, with PE router 12A and CE router 16A as upstream routers along the paths toward source 20. PE router 12B and PE router 12A are IBGP neighbors (IBGP peers), so path 15 is referred to as an IBGP path 15, and PE router 12B and CE router 16A are EBGP neighbors (EBGP peers), so path 17 is referred to as an EBGP path 17. This situation is referred to as an "EIBGP" multipath case. In addition, PE router 12A may receive a downstream join request 14B from CE router 16B for the same multicast group. PE router 12A likewise will examine the possible paths toward source 20, and similarly has an IBGP path 15 and an EBGP path 19 from which to choose an upstream router to which to send the join request.

If both PE router 12A and PE router 12B were to choose the IBGP path, selecting each other as upstream routers for sending a join request, this could create a loop in the control plane of the PE router, such that the join requests would not be propagated to source 20. When a join loop occurs, source 20 would not get a message to send the desired multicast traffic for the multicast group to PE routers 12A, 12B, and receivers 21A and 21C will never receive multicast data traffic for (S, G) from source 20.

The techniques of this disclosure enable a PE router to select an upstream router to which to send a join request in the EIBGP multipath case in a manner so as to avoid join loops and also to load balance join requests across the PE routers. In one example aspect, as described in further detail below with respect to FIG. 3, PE routers 12 may, in an NG MVPN, be configured to use an approach for selecting an upstream router to which to send a join request, where the approach uses a combination of a counter-based and a hash-based method for selecting the upstream router.

As another example, as described in further detail below with respect to FIG. 4, PE routers 12 may, in a Rosen MVPN, be configured to use a simple approach for selecting an upstream router to which to send a join request, in which an upstream router on an EBGP path toward the source is selected as the upstream router when a join request is received on a core-facing interface (i.e., an interface connected to an IBGP peer). As described in further detail below, other features may be added to avoid unnecessary changes to the reverse path forwarding (RPF) interface configured on a PE router 12 when selecting an upstream router for sending a join request. Avoiding a change to the RPF interface may avoid disruption to existing multicast traffic flows. In some examples, PE routers 12 may store state information regarding join requests or multicast traffic seen on a multicast tunnel (MT) interface, and use this state information to select an appropriate upstream router to which to send a downstream join request.

Figure 2:
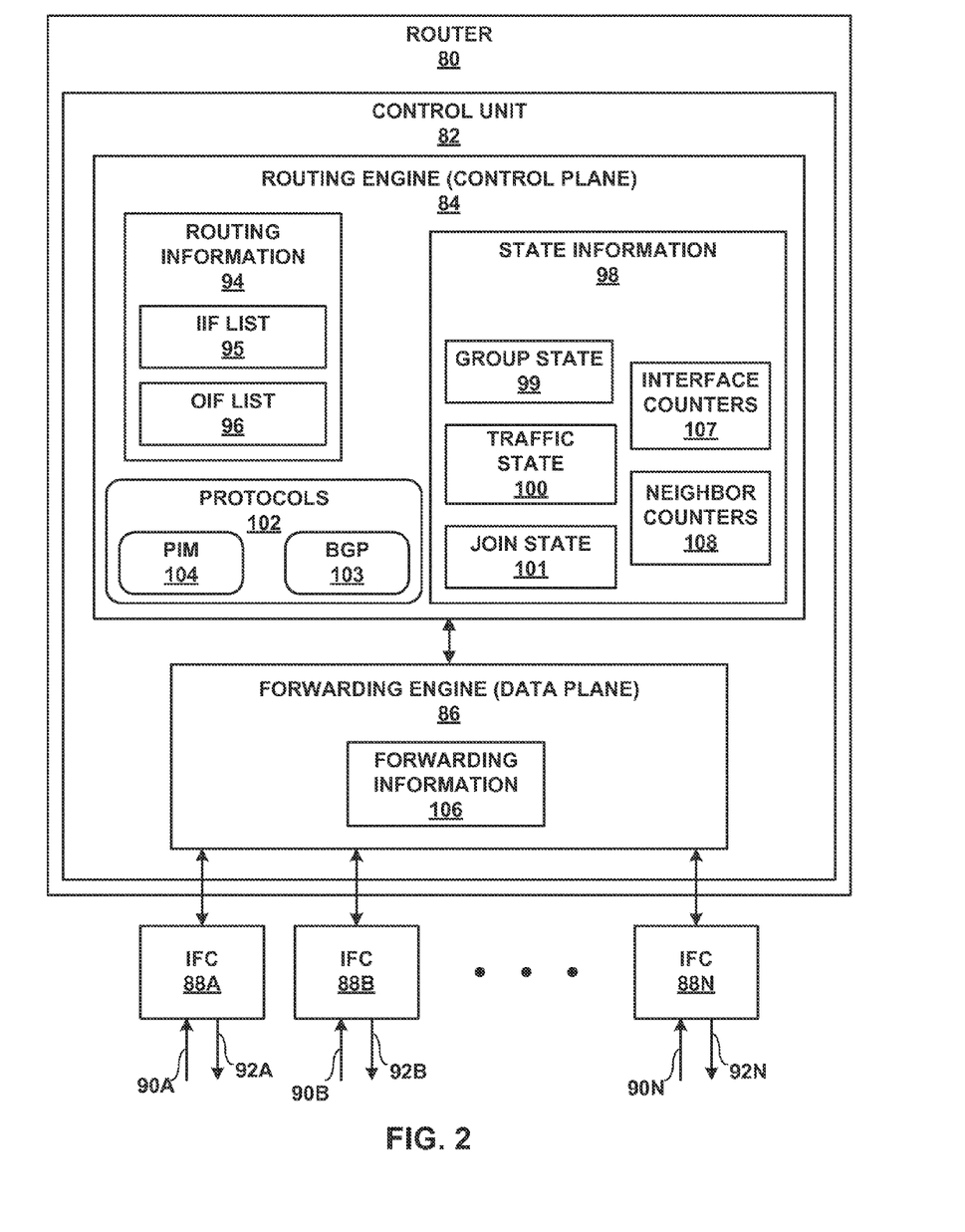
FIG. 2 is a block diagram illustrating an example router capable of performing the techniques of this disclosure.

FIG. 2 is a block diagram illustrating an example router 80 capable of performing the disclosed techniques for load balancing join requests across upstream routers and avoiding join loops in the network. In general, router 80 may operate in a manner substantially similar to any of the routers illustrated in FIG. 1.

In this example, router 80 includes interface cards 88A-88N ("IFCs 88") that receive multicast packets via incoming links 90A-90N ("incoming links 90") and send multicast packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 includes a routing engine 84 and a packet forwarding engine 86. Routing engine 84 operates as the control plane for router 80 and includes an operating system that provides a multi-tasking operating environment for execution of a number of concurrent processes. Routing engine 84 may implement one or more routing protocols 102 to execute routing processes. For example, routing protocols 102 may include Border Gateway Protocol (BGP) 103, for exchanging routing information with other routing devices and for updating routing information 94. In addition, routing protocols 102 may include PIM 104 for routing traffic through a computer network with other routing devices conceptually formed into shared tress. Routing engine 84 may also implement PIM 104 for exchanging link state information with other routing devices and updating state information 98, and routing multicast traffic through the shared trees according to routing information 94 and state information 98.

Routing information 94 may describe a topology of the computer network in which router 80 resides, and may also include routes through the shared trees in the computer network. Routing information 94 describes various routes within the computer network, and the appropriate next hops for each route, i.e., the neighboring routing devices along each of the routes. In the illustrated example, routing information 94 includes an incoming interface (IIF) list 95 and an outgoing interface (OIF) list 96 that indicates which of IFCs 88 are connected to neighboring routing devices in each route. For example, a given route may comprise a route for multicast traffic for a given multicast group G. In that example, IIF list 95 may indicate RPF interfaces for multicast groups, from which data traffic for the multicast groups will come, and OIF list 96 may indicate downstream interfaces, to which to forward the data traffic for the multicast groups.

State information 98 may describe a current status of links between routing devices in the shared trees for the network. In the illustrated example, state information 98 includes group state 99 that describes which routing devices belong to which multicast groups within the range for the shared tree. In FIG. 2, state information 98 also includes traffic state 100, which in some examples includes timers associated with installed forwarding routes associated with multicast groups, where routing engine 84 removes the installed forwarding routes from forwarding information 106 if multicast traffic is not received for the multicast group by router 80 before the timer expires. State information 98 also includes join state 101, which in some examples is used by router 80 to store indications of join requests seen over the MT interface of router 80 as received by peer routers, in accordance with the techniques described in this disclosure.

In the example of FIG. 2, state information 98 also includes interface counters 107 that indicate a number associated with each interface of router 80, where the number specifies the number of multicast flows for which join requests have been sent on each interface. State information 98 further includes neighbor counters 108 that indicate a number associated with each neighboring router of router 80, where the number specifies the number of multicast flows for which the neighboring router has been selected as the upstream router and to which join requests have been sent. In some aspects, interface counters 107 and neighbor counters 108 may include individual counters maintained per MVPN. Routing engine 84 may use some or all of state information 98 in various embodiments of the techniques described herein for load balancing join requests across upstream routers, avoiding join loops, and minimizing multicast traffic disruption.

In some examples, router 80 may be associated with a certain range of multicast groups (*, G_prefix). For each specific multicast group within the range, router 80 may maintain an IIF list 95 and an OIF list 96 within routing information 94, a group state 99 and a traffic state 100, and join state 101 within state information 98. In addition, for each specific multicast group within the range, router 80 may include forwarding routes in forwarding information 106 to the downstream routers in the shared tree that belong to the multicast group.

Routing engine 84 analyzes stored routing information 94 and state information 98 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures. Forwarding information 106 may include specific routes to forward multicast traffic for a given multicast group to neighboring routing devices. In general, when router 80 receives a multicast packet via one of inbound links 90, control unit 82 determines a next hop for the packet in accordance with forwarding information 106 and state information 98, and forwards the packet according to the next hop.

The techniques described in this disclosure are directed toward load balancing join requests across upstream routers, while avoiding join loops and minimizing multicast traffic disruption. Example operation of router 80 in selecting an upstream router to which to send a join request in NG MVPNs and Rosen MVPNs are described in further detail below.

Figure 3:
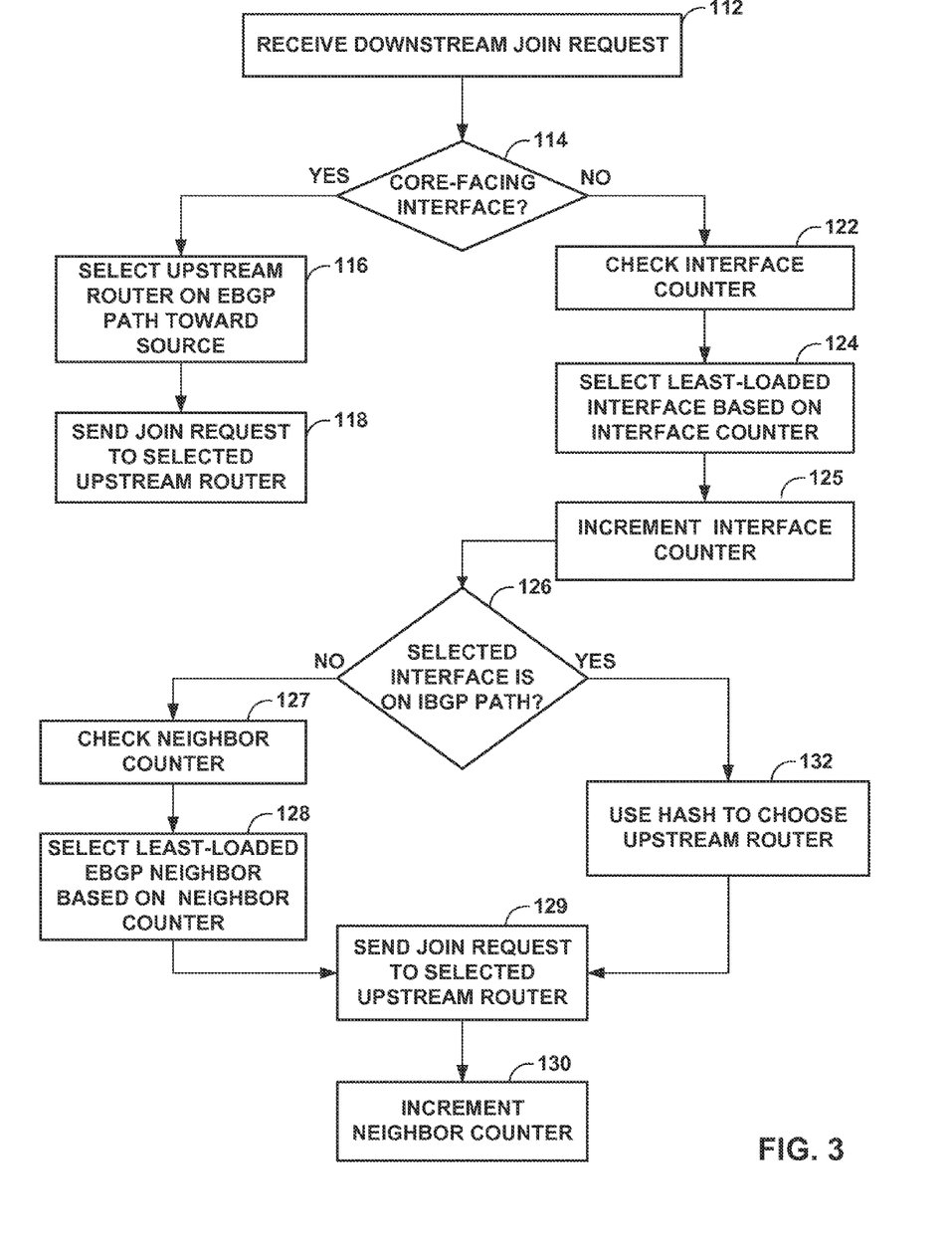
FIGS. 3-7 are flowcharts illustrating various example operations of network devices in accordance with the techniques of this disclosure.

FIG. 3 is a flowchart illustrating example operation of network devices in accordance with the techniques of this disclosure. FIG. 3 illustrates example operation of devices for providing join load-balancing support and join-loop avoidance in a next generation MVPN. FIG. 3 will be described for purposes of example with respect to PE router 12B in the example system 2 of FIG. 1, and router 80 of FIG. 2. In the example of FIG. 3, PE router 12B receives a downstream join request via a downstream interface (112). When the join request is received on a core-facing interface (YES branch of 114), such as join request 14C from PE router 12C, PE router 12B automatically selects as the upstream router a CE router on an EBGP path toward source 20 (e.g., CE router 16A), rather than selecting an IBGP path over a core-facing interface (116). PE router 12B sends the join request to the selected upstream router, CE router 16A (118). Automatically selecting a CE router on an EBGP path when a join request is received from a core-facing interface may otherwise avoid a join loop within the core network 10. In this case. PE routers 12 need not necessarily perform join load balancing for multicast groups (S, G) for which the PE routers 12 have data multicast distribution tree cache information.

If the interface on which the join request is received is not a core-facing interface (NO branch of 114), PE router 12B uses a combination of a counter-based approach and a hash-based approach for selecting an upstream router to which to send the join request in a manner that load-balances join requests. Routing engine 84 of PE router 12B checks interface counters 107 (122) to select a least-loaded interface, i.e., an interface having a least number of multicast flows for which join requests have been sent on the interface (124). Routing engine 84 increments the interface counter 107 associated with the selected interface (125).

There may be multiple neighbors on a single interface. When the selected interface is not associated with an IBGP path toward source 20 (NO branch of 126), but rather lies on an EBGP path toward source 20 (e.g., path 17 to CE router 16A), routing engine 84 checks the neighbor counters 108 associated with the selected interface (127), and selects the least-loaded EBGP neighbor router based on the neighbor counters (128) to which to send the join request. PE router 12B then sends the join request to the selected upstream router, e.g., CE router 16A (129), and increments the neighbor counter 108 associated with CE router 16A (130).

Routing engine 84 may treat the interface to an IBGP path 15 as a pseudo upstream interface. If the selected interface is the pseudo upstream interface, that is, for a PE router on an IBGP path 15 toward source 20 (YES branch of 126), then routing engine 84 applies a hash-based technique to select an upstream router. As one example, routing engine 84 may apply the hash-based technique specified in Internet Draft, DRAFT-IETF-L3VPN-2547BIS-MCAST-10, "Multicast in MPLS/BGP IP VPNs," Internet Engineering Task Force, Jan. 28, 2010 (hereinafter, "Internet Draft on Multicast in MPLS/BGP IP VPNs"). This hash-based technique is described in further detail below.

In the following description of an example hash-based technique, the term "C-tree" is used to refer to a multicast distribution tree whose nodes include CE routers. See section 3.1 of the Internet Draft on Multicast in MPLS/BGP IP VPNs for further explication of this terminology. The algorithm specified in the Internet Draft on Multicast in MPLS/BGP IP VPNs ensures that, except during routing transient, each PE router chooses the same upstream router for a given combination of source device, rendezvous point, and multicast group (e.g., C-Src/C-RP and C-G).

The first step in selecting the upstream multicast hop for a given C-root is to select the upstream router for that C-root. The PE router that received the C-Join message looks in the virtual routing and forwarding table (VRF) corresponding to the interfaces over which the C-Join was received. The PE router finds the Eligible upstream multicast hop (UMH) route that is the best match for the C-root specified in that C-Join. Call this the "Installed UMH Route". Note that the outgoing interface of the Installed UMH Route may be one of the interfaces associated with the VRF, in which case the upstream multicast hop is a CE router and the route to the C-root is not across the VPN backbone.

Consider the set of all VPN-IP routes that are: (a) eligible to be imported into the VRF (as determined by their Route Targets), (b) are eligible to be used for upstream multicast hop selection, and (c) have exactly the same IP prefix (not necessarily the same route distinguisher (RD)) as the installed UMH route. For each route in this set, determine the corresponding upstream PE router and upstream RD. If a route has a VRF Route Import Extended Community, the route's upstream router is determined from it. If a route does not have a VRF Route Import Extended Community, the route's upstream router is determined from the route's BGP next hop attribute. In either case, the upstream RD is taken from the route's NLRI. This results in a set of triples of <route, upstream PE, upstream RD>. Call this the "UMH Route Candidate Set." Then the PE MUST select a single route from the set to be the "Selected UMH Route". The corresponding upstream router is known as the "Selected Upstream PE", and the corresponding upstream RD is known as the "Selected Upstream RD".

The algorithm from the Internet Draft on Multicast in MPLS/BGP IP VPNs works as follows: (1) The PE routers in the candidate set are numbered from lower to higher IP address, starting from 0. (2) The following hash is performed: A bytewise exclusive-or of all the bytes in the C-root address and the C-G address is performed. The result is taken modulo n, where n is the number of PE routers in the candidate set. Call this result N. The selected upstream PE router is then the one that appears in position N in the list of step 1.

For a NG MVPN, the IP address of PE routers in RT import extended community is used for ordering in the candidate set. To make sure all PE routers choose the same upstream PE router for a given combination of C-Src/C-RP and C-G, routing engine 84 rehashes on all the existing flows when the PE routers candidate set changes (i.e., existing PE routers are removed or new PE routers are added to the candidate set). In some cases, this may cause traffic disruption to the existing flows. The performance of join load balancing depends on the c-multicast flow distribution, and may not balance well for some c-multicast flow distribution. In other example aspects, different hash-based techniques may be used for selecting the upstream PE router.

Routing engine 84 does not need to do load balancing for (S, G) for which it has a matching selective provider multicast service interface (S-PMSI) auto-discovery (AD) route. When that happens, routing engine 84 chooses the PE router advertising the S-PMSI as the upstream PE router.

Figure 4:
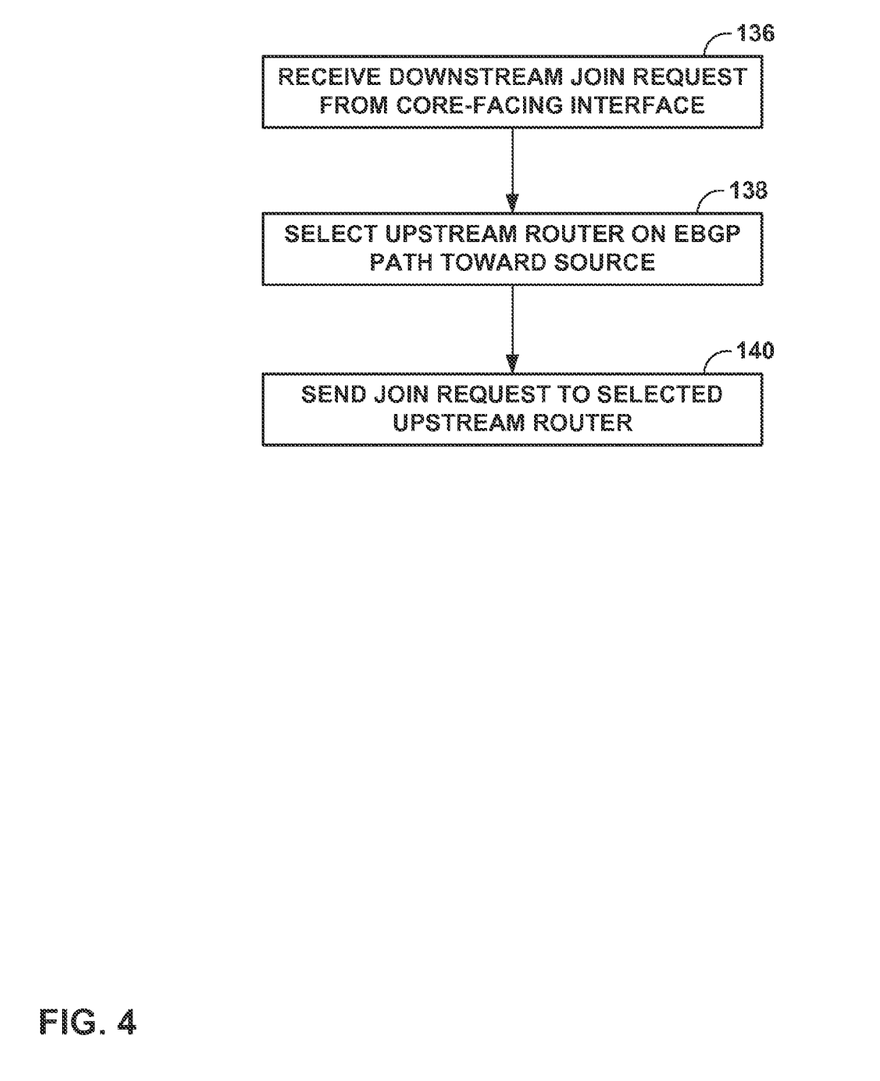

FIG. 4 is a flowchart illustrating example operation of network devices in accordance with the techniques of this disclosure. In particular, FIG. 4 illustrates example operation of devices for avoiding join loops in an MVPN such as a Rosen MVPN in accordance with the techniques of this disclosure. In one example aspect, PE routers that use Rosen MVPNs may use a simple approach for join-loop avoidance, as illustrated in FIG. 4. Routers that use a NGen MVPN may also incorporate the simple approach into the overall technique used, as described above with respect to FIG. 3.

In the example of FIG. 4, when PE router 12A receives a join request from a core-facing interface, such as from PE router 12B (136), PE router 12A automatically selects as the upstream router a CE router on an EBGP path toward source 20 (e.g., CE router 16A), rather than selecting an IBGP path over a core-facing interface (138). PE router 12A sends the join request to the selected upstream router, CE router 16A (140). Automatically selecting a CE router on an EBGP path when a join request is received from a core-facing interface may otherwise avoid a join loop within the core network 10.

In this case, PE routers 12 need not necessarily perform join load balancing for multicast groups (S, G) for which the PE routers 12 have data multicast distribution tree cache information. In those cases, PE routers 12 join on the data multicast distribution tree to the source PE router that advertises the data multicast distribution tree.

In some cases, applying the simple approach of selecting an upstream router on an EBGP path when receiving a join request from a core-facing interface may cause traffic disruption to existing traffic flows. For example, this approach could cause PE router 12A to change its upstream neighbor when PE router 12A receives a join request from the provider core. It may therefore be desired to use some optional enhancements in conjunction with the counter-based techniques described above, as explained below with respect to FIGS. 5-7.

Figure 5:
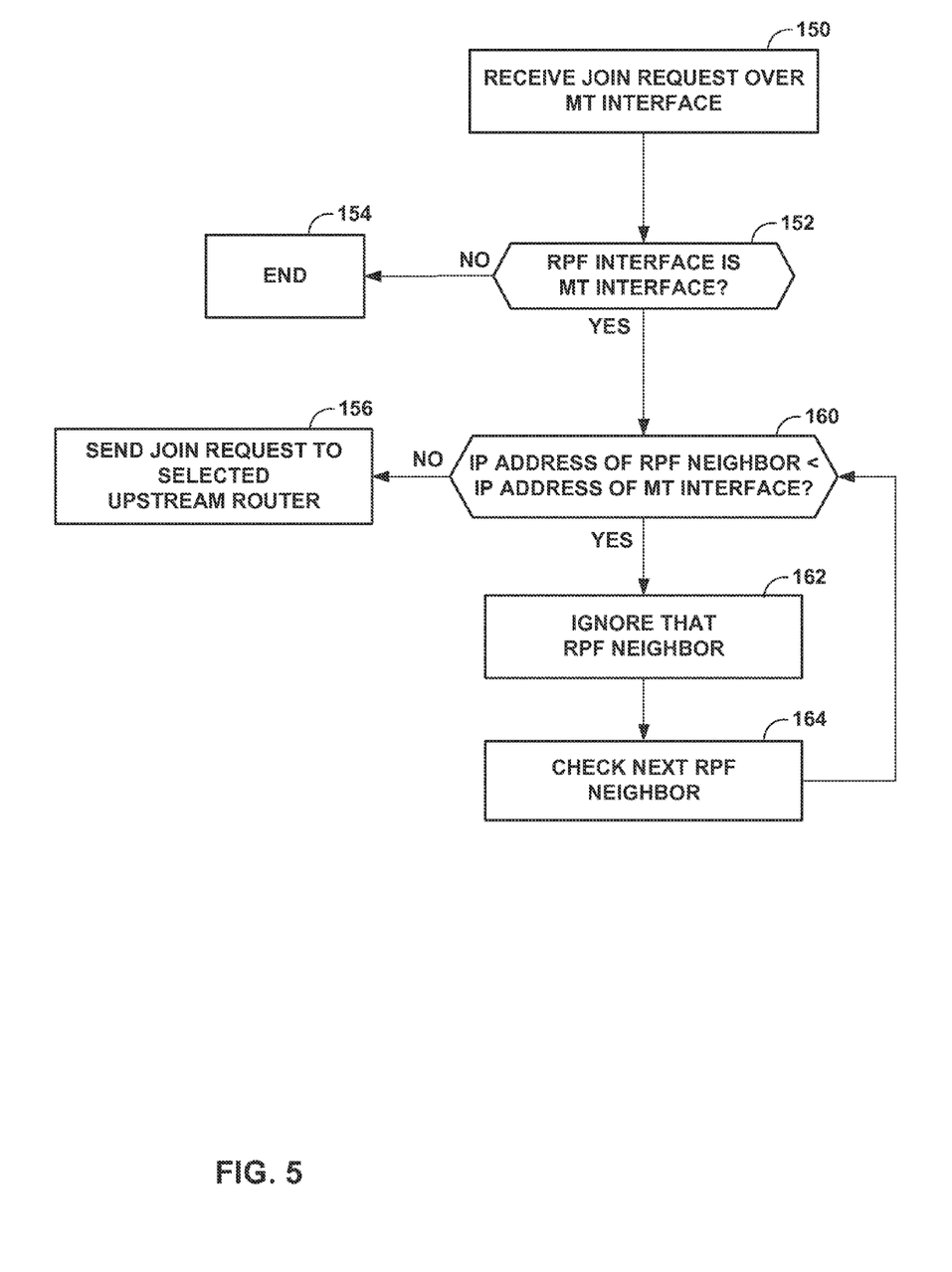

FIG. 5 is a flowchart illustrating example operation of network devices in accordance with the techniques of this disclosure. In particular, FIG. 5 illustrates example operation of devices for join-loop avoidance in a Rosen MVPN in accordance with the techniques of this disclosure. The techniques of FIG. 5 may be used in conjunction with the counter-based techniques described above. As described earlier, following the simple approach when receiving a join request from a core-facing interface could cause a PE router to change its upstream neighbor when the PE router receives a join request from the provider core. This could result in traffic disruption to the existing flows through the PE router. It may be preferable to minimize or avoid a change to the reverse path forwarding (RPF) interface. FIG. 5 is an example that provides a variation on the simple approach, to avoid some changes to the RPF interface.

In this example, to prevent join loop in the control plane, router 12A does not necessarily select an EBGP path when it receives a downstream join over a core-facing interface. Join loops can be prevented in computer system 2 of FIG. 1 if each PE router follows a tie breaker rule: when a PE router receives a downstream join over the provider core, the PE router must not send the join request to another PE router with lower IP address. PE routers 12 each have a logical interface that represents the multicast tree in the core network 10, called the multicast tunnel (MT) interface. With reference to FIGS. 1 and 2, when PE router 12A receives a downstream join over its MT interface (150), routing engine 84 checks whether the RPF interface is the MT interface (152). If the RPF interface is not the MT interface, then a loop will not be formed because routing engine 84 has already previously chosen an upstream router on an EBGP path toward source 20 (e.g., CE router 16A), so no further action is required of routing engine 84 and the process ends (154). For example, a join request for this multicast group has already previously been received and the EBGP path was chosen then, and the downstream join request now received is simply a join refresh.

If the RPF interface is the MT interface (YES branch of 152), routing engine 84 does the tie breaker check as specified as below. Routing engine 84 compares its MT interface IP address with the IP address of the RPF neighbor on the MT interface (160). If the RPF neighbor address is lower than the MT interface address (YES branch of 160), routing engine 84 ignores that RPF neighbor (162) and does not select it as the upstream router to which to send the join request, and continues by checking other available RPF neighbor choices (164). If the RPF neighbor address is higher than the MT interface address (YES branch of 160), then routing engine 84 sends the join request to the selected upstream router (156).

As a result, on the MT interface, routing engine 84 always sends the join request to the neighbor with a higher IP address, and so a loop could not be formed.

Figure 6:
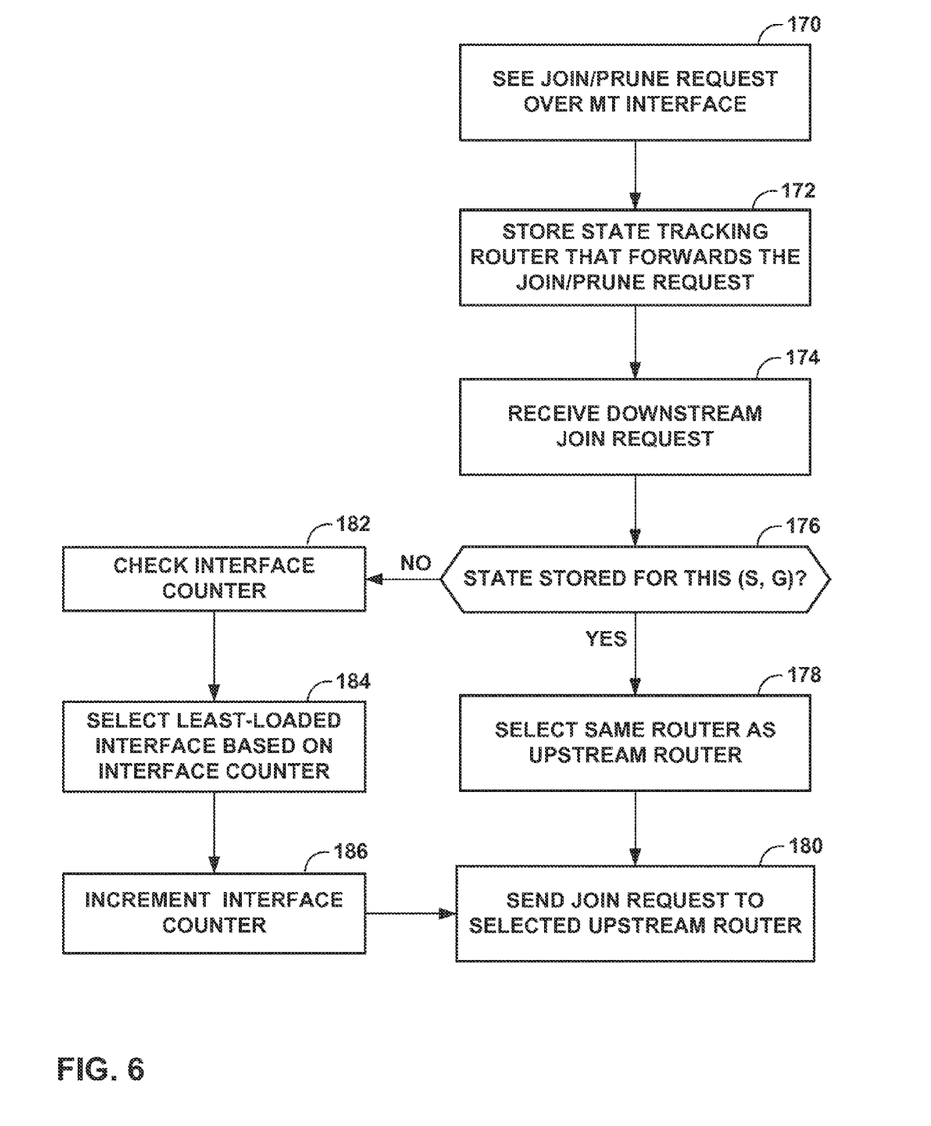

FIG. 6 is a flowchart illustrating example operation of network devices in accordance with the techniques of this disclosure. In particular, FIG. 6 illustrates example operation of devices in a Rosen MVPN in accordance with the techniques of this disclosure. FIG. 6 illustrates another technique that may be used to enhance selection of the upstream router for sending a join request. The techniques of FIG. 6 may be used in conjunction with the counter-based techniques described above.

PIM join and prune requests sent by PE routers 12 in network 10 of FIG. 1 are seen by all PE routers on the MT interface. In this way, the MT interface of a PE router operates as though it were a local area network (LAN) interface, and PE routers 12 can monitor join/prune requests on the MT interface. PE router 12A monitors when PE router 12C sends a join request 14C to PE router 12B for a given multicast group (S, G). PE router 12A can see the join request, as it is broadcast on the MT interface, and PE router 12A stores state in join state 101 (FIG. 2) that keeps track of the join request. PE router 12A can later use the stored join state 101 for making a decision on which upstream router to select for sending a join request for the same multicast group (S, G). For example, routing engine 84 then receives a downstream join request for a given (S, G) (174), and checks whether state is stored in join state 101 for this (S, G) (176). As one example, when state has already been stored because PE router 12A stored state in join state 101 when PE router 12C sent a join request to PE router 12B for the (S, G), routing engine 84 of PE router 12A sees that PE router 12C already has selected PE router 12B as an upstream router for (S, G). Routing engine 84 of PE router 12A then likewise selects PE router 12B as its upstream router for sending the join request (178), and sends the join request to the selected upstream router (180).

When the received downstream join request is the first downstream join request seen for the (S, G), and therefore no state exists (NO branch of 176), PE router can use the counter-based approach. For example, routing engine 84 checks interface counters 107 (182) to select a least-loaded interface, i.e., an interface having a least number of multicast flows for which join requests have been sent on the interface (184). Routing engine 84 increments the interface counter 107 associated with the selected interface (186).

In some situations, more than one PE router could send a join request to the MT interface around the same time (i.e., before the MT forwarder is selected), then the tie breaker mechanism of FIG. 5 may be used to determine the MT interface forwarder. Therefore, the router only needs to change RPF interface when the forwarder competition occurs. At this time, the data traffic has not started yet, and so this will not disrupt the existing traffic. One downside of this approach is that the PE routers need to maintain S, G state to track the join requests over the MT interface.

Figure 7:
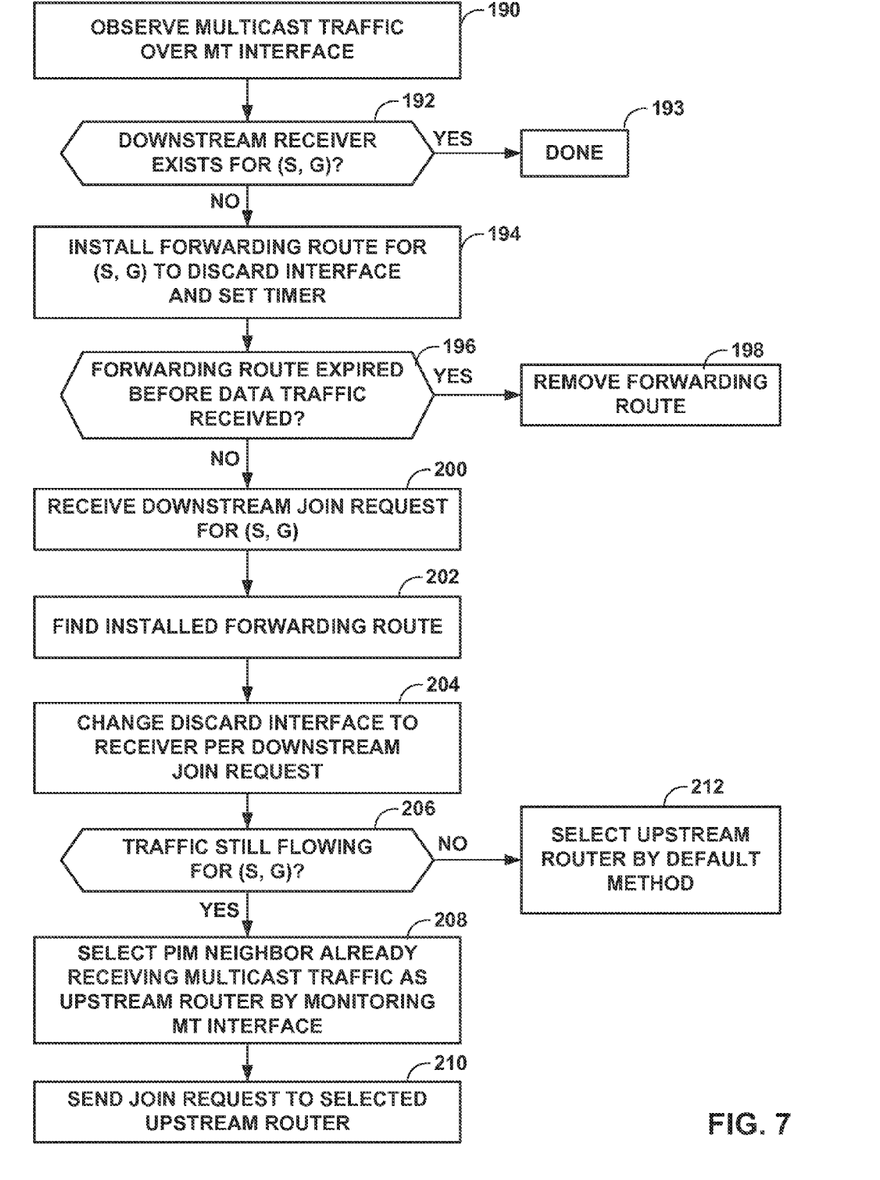

FIG. 7 is a flowchart illustrating example operation of network devices in accordance with the techniques of this disclosure. In particular, FIG. 7 illustrates example operation of devices in a Rosen MVPN in accordance with the techniques of this disclosure. The techniques of FIG. 7 may be used in conjunction with the counter-based techniques described above. In addition to seeing join and prune requests over the MT interface, PE routers 12 also see multicast traffic on their respective MT interfaces. For example, a PE router, such as PE router 12A, may detect on its MT interface multicast traffic for a multicast group (S, G), such as PE router 12B (190). If a downstream receiver already exists for the multicast group then no further action is required of PE router 12A (193), because presumably PE router 12A already has selected an upstream router. When PE router 12A does not already have a downstream router for the multicast group (S, G) (NO branch of 192), routing engine 84 of the PE router 12A may install a forwarding route in forwarding information 106, where the outbound interface of the forwarding route is set to the discard route (194), which means that any multicast traffic received by PE router 12A for this multicast group is dropped by PE router 12A. Routing engine 84 also sets a timer for the installed forwarding route in traffic state 100 of state information 98 (194). If the forwarding route timer expires before PE router 12A receives multicast data traffic for the multicast group (S, G) (YES branch of 196), routing engine 84 removes the forwarding route from forwarding information 106 (198).

If the forwarding route timer has not expired before PE router 12A receives multicast data traffic for the multicast group (S, G) (NO branch of 196), and PE router 12A receives a downstream join request requesting multicast traffic for the multicast group (S, G) to be sent to a receiver 21 (200), upon receipt of the downstream join request routing engine 84 checks forwarding information 106 for a corresponding forwarding route and finds the installed forwarding route (202). Routing engine 84 changes the forwarding route from a discard state to the interface corresponding to the next hop for forwarding multicast traffic to the receiver 21 (204). If PE router 12B stops forwarding multicast traffic for the multicast group after the forwarding route is installed on PE router 12A but before PE router 12A receives a downstream join request, PE router 12A may not be aware of the change. After receiving the join request, routing engine 84 therefore checks traffic statistics for the multicast group to determine whether PE router 12B is still forwarding traffic for the multicast group (S, G) (206). For example, routing engine 84 may send a query to the kernel of PE router 12A requesting a current data rate for this multicast group over the MT interface. If traffic is still flowing through the PIM neighbor for the multicast group (S, G) (YES branch of 206), routing engine 84 waits to see the next join refresh over the MT interface to know the upstream neighbor chosen for that (S, G), and then routing engine 84 selects the PIM neighbor PE router 12B as the upstream router for PE router 12A to which to send the downstream join request (208). PE router 12A then sends the downstream join request to the selected upstream router (210).

If routing engine 84 determines that multicast traffic is no longer flowing for the multicast group (NO branch of 206), routing engine 84 may select an upstream router to which to send the join request by a default method (212). For example, routing engine 84 may turn to another of the methods described herein, such as that illustrated in FIG. 4 or 5.

The example mechanism illustrated in FIG. 7 avoids storing as much control state (e.g., join state 101 indicating when join requests are seen over the MT interface is not required). In the previous approach described in FIG. 6, PE router 12A would track all join requests even before a receiver 21 is necessarily there requesting the traffic. In contrast, the approach of FIG. 7 allows for a later start to tracking join state. This approach may not work as well for "bursty" traffic. For example, if PE router 12A has not received traffic from PE router 12B in awhile, PE router 12A may choose a different upstream router even though PE router 12B would still be a suitable choice.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of this disclosure have been described. These and other aspects are within the scope of the following claims.

The invention claimed is:

1. A method comprising:
receiving a join request on a downstream interface of a network device, wherein the join request specifies a source device and a multicast group, wherein the network device is positioned within a core network of a multicast virtual private network (MVPN) that transmits multicast traffic between the source device and a plurality of receivers associated with customer sites; and
determining whether to send the join request to an upstream router positioned on an Exterior Border Gateway Protocol (EBGP) path toward the source device or to an upstream router positioned on an Interior BGP (IBGP) path toward the source device from among a plurality of upstream routers, based at least in part on:
identifying a least-loaded upstream router, wherein state information maintained by the network device indicates that the least-loaded upstream router is currently set as an upstream router for a least number of multicast flows as compared to other upstream routers in the plurality of upstream routers; when the least-loaded router is on the EBGP path toward the source device, selecting the least-loaded router as the upstream router to which to send the join request; and
when the least-loaded router is on the IBGP path toward the source device, running a hash calculation to select an upstream router on one of a plurality of IBGP paths toward the source device, wherein running the hash calculation ensures that the network device selects the same upstream router for a given combination of multicast source device, rendezvous point, and multicast group; and
sending the join request to the selected upstream router.

2. The method of claim 1, further comprising:
checking stored counters to determine which of the plurality of upstream routers is the least-loaded upstream router; and selecting the least-loaded upstream router based on the determination.

3. The method of claim 1, wherein the upstream router positioned on an EBGP path toward the source device comprises a customer edge (CE) router.

4. The method of claim 1, wherein an underlying transport infrastructure of the MVPN comprises multicast Generic Routing Encapsulation (GRE) tunnels.

5. The method of claim 1, wherein an underlying transport infrastructure of the MVPN comprises Multi-Protocol Label Switching (MPLS) Label Switched Paths (LSPs).

6. A method comprising:
receiving a join request on a downstream interface of a network device, wherein the downstream interface is a multicast tunnel (MT) interface of the network device, wherein the join request specifies a source device and a multicast group, wherein the network device is positioned within a core network of a multicast virtual private network (MVPN) that transmits multicast traffic between the source device and a plurality of receivers associated with customer sites;
checking whether a reverse path forwarding (RPF) interface of the network device is the MT interface;
in response to determining that the RPF interface is not the MT interface, selecting a router on an Exterior Border Gateway Protocol (EBGP) path toward the source device as an upstream router to which to send the received join request;
in response to determining that the RPF interface is the MT interface, selecting, as the upstream router to which to send the received join request, an RPF neighbor router having a network address that is greater than a network address of the MT interface of the network device;
sending the join request to the selected upstream router;
installing a forwarding route on the network device for a multicast group when multicast data traffic for the multicast group is received over the MT interface, wherein when the network device has no receiver for the multicast group, the forwarding route is set to a discard route; and
setting a timer for the forwarding route such that the forwarding route is removed if multicast data traffic for the multicast group is not received by the network device before the timer expires.

7. The method of claim 6, further comprising:
with the network device, storing state information that tracks multicast data traffic received over the MT interface of the network device; and
determining, based at least in part on the state information, whether to send the join request to an upstream router positioned on an EBGP path toward the source device or to an upstream router positioned on an Interior BGP (IBGP) path toward the source device from among a plurality of upstream routers.

8. The method of claim 7, wherein determining comprises, when the state information indicates that a join request for the multicast group associated with the join request received on the downstream interface, selecting the same upstream router as was selected by a neighboring network device for sending a join request for the multicast group.

9. The method of claim 6, further comprising:
when multicast data traffic for the multicast group is received by the network device before the timer expires, selecting an upstream router to which to send the join request received on the downstream interface by monitoring for a join request received over the MT interface and selecting a same upstream router based on the join request received over the MT interface.

10. The method of claim 6, wherein the join request comprises a first join request, the method further comprising:
receiving a second join request on a core-facing downstream interface of a network device, wherein the second join request specifies a second source device and a second multicast group;
based at least in part on determining that the second join request was received on the core-facing downstream interface, selecting an upstream router on an Exterior Border Gateway Protocol (EBGP) path toward the source device as the upstream router to which to send the second join request; and
sending the second join request to the upstream router selected as the upstream router to which to send the second join request.

11. A router comprising:
a set of interfaces that transfer control messages and multicast traffic with at least one neighboring downstream router and a plurality of neighboring upstream routers,
wherein a downstream one of the set of interfaces receives a join request from the neighboring downstream router, wherein the join request specifies a source device and a multicast group; and
a control unit that determines whether to send the join request to an upstream router positioned on an Exterior Border Gateway Protocol (EBGP) path toward the source device or to an upstream router positioned on an Interior BGP (IBGP) path toward the source device from among a plurality of upstream routers, based at least in part on:
the control unit identifying an upstream router as a least-loaded upstream router when state information maintained by the router indicates that the least-loaded upstream router is currently set as an upstream router for a least number of multicast groups as compared to other upstream routers in the plurality of upstream routers;
wherein when the least-loaded upstream router is on the EBGP path toward the source device, the control unit selects the least-loaded router as the upstream router to which to send the join request, and
wherein when the least-loaded router is on the IBGP path toward the source device, the control unit runs a hash calculation to select an upstream router on an IBGP path toward the source device, wherein running the hash calculation ensures that the router selects the same upstream router for a given combination of multicast source device, rendezvous point, and multicast group,
wherein the control unit sends the join request to the selected upstream router.

12. The router of claim 11, wherein the control unit checks stored counters to determine which of the plurality of upstream routers is the least-loaded upstream router, and selects the least-loaded upstream router based on the determination.

13. The router of claim 11, wherein the upstream router positioned on an EBGP path toward the source device comprises a customer edge (CE) router.

14. The router of claim 11, wherein an underlying transport infrastructure of the MVPN comprises multicast Generic Routing Encapsulation (GRE) tunnels.

15. The router of claim 11, wherein an underlying transport infrastructure of the MVPN comprises Multi-Protocol Label Switching (MPLS) Label Switched Paths (LSPs).

16. A non-transitory computer-readable storage medium encoded with instructions for causing one or more programmable processors to:
receive a join request on a downstream interface of a network device, wherein the join request specifies a source device and a multicast group, wherein the network device is positioned within a core network of a multicast virtual private network (MVPN) that transmits multicast traffic between the source device and a plurality of receivers associated with customer sites;
determine whether to send the join request to an upstream router positioned on an Exterior Border Gateway Protocol (EBGP) path toward the source device or to an upstream router positioned on an Interior BGP (IBGP) path toward the source device from among a plurality of upstream routers, based at least in part on:
identifying a least-loaded upstream router, wherein state information maintained by the network device indicates that the least-loaded upstream router is currently set as an upstream router for a least number of multicast flows as compared to other upstream routers in the plurality of upstream routers;
when the least-loaded router is on the EBGP path toward the source device, selecting the least-loaded router as the upstream router to which to send the join request; and
when the least-loaded router is on the IBGP path toward the source device, running a hash calculation to select an upstream router on one of a plurality of IBGP paths toward the source device, wherein running the hash calculation ensures that the network device selects the same upstream router for a given combination of multicast source device, rendezvous point, and multicast group; and
send the join request to the selected upstream router.

* * * * *